US007480055B2

(12) United States Patent
Buijs et al.

(10) Patent No.: US 7,480,055 B2
(45) Date of Patent: Jan. 20, 2009

(54) TWO-BEAM INTERFEROMETER FOR FOURIER TRANSFORM SPECTROSCOPY WITH DOUBLE PIVOT SCANNING MECHANISM

(75) Inventors: Henry L. Buijs, Sillery (CA); Jacques McKinnon, Cap Rouge (CA)

(73) Assignee: ABB Bomem Inc., Quebec (CA)

( * ) Notice: Subject to any disclaimer, the term of this patent is extended or adjusted under 35 U.S.C. 154(b) by 57 days.

(21) Appl. No.: 11/652,778

(22) Filed: Jan. 12, 2007

(65) Prior Publication Data
US 2008/0170232 A1 Jul. 17, 2008

(51) Int. Cl.
*G01B 9/02* (2006.01)
*G01J 3/45* (2006.01)

(52) U.S. Cl. .................................... 356/455
(58) Field of Classification Search ................ 356/450, 356/451, 455; 359/577
See application file for complete search history.

(56) References Cited
U.S. PATENT DOCUMENTS
4,278,351 A   7/1981 Breckinridge et al.

| 4,383,762 A | 5/1983 | Burkert |
| 5,309,217 A | 5/1994 | Simon et al. |
| 5,949,543 A | 9/1999 | Bleier et al. |
| 6,141,101 A | 10/2000 | Bleier et al. |
| 6,469,790 B1 | 10/2002 | Manning |

FOREIGN PATENT DOCUMENTS
CA   1114193   12/1981

*Primary Examiner*—Michael A Lyons
(74) *Attorney, Agent, or Firm*—Michael M. Rickin; Michael C. Prewitt

(57) ABSTRACT

A two-beam interferometer for Fourier Transform spectroscopy has a double pivot scanning mechanism. The interferometer has two rigid pendulums that are each rotatable to swing around an associated one of distinct axes of rotation. A linkage links the two rigid pendulums to each other and constrains their rotation relative to each other. The interferometer has bearings, which may be flexure bearings, for rotatably mounting the two pendulums to swing around an associated one of the distinct axes of rotation and a first and a second bearing linking the linkage to an associated one of the pendulums. The two rigid pendulums, the linkage and the bearings can be a monolithic structure.

19 Claims, 12 Drawing Sheets

TWO-BEAM INTERFEROMETER FOR FOURIER TRANSFORM SPECTROSCOPY WITH DOUBLE PIVOT SCANNING MECHANISM

FIELD OF THE INVENTION

The present invention relates to the field of Near IR and Mid IR spectroscopy using the technology of Fourier Transform IR Spectroscopy usually identified as FTIR or FTNIR and more specifically the construction of the optical modulator part of the FTIR or FTNIR also known as a scanning Michelson Interferometer.

DESCRIPTION OF THE PRIOR ART

Fourier Transform spectroscopy is an alternate technique to the classical approach of using a prism or a diffraction grating to separate different wavelengths for analysis of intensity versus wavelength. In Fourier Transform Spectroscopy, incident radiation is intensity modulated by an optical modulator assembly (OMA), commonly called a scanning Michelson interferometer, such that each distinct wavelength has a unique sinusoidal modulation frequency. Fourier analysis of the modulated intensity provides the intensity versus wavelength.

Fourier Transform spectroscopy has several significant advantages over the classical dispersion or diffraction approach. These advantages are: 1) Using a single radiation capture device or IR detector, all wavelengths are measured simultaneously providing a multiplex advantage also known as the Felgett advantage, 2) The OMA does not require a slit to segregate different wavelengths and hence has an optical efficiency advantage commonly known as the Jacquinot advantage, 3) The wavelength calibration is determined by the relationship between modulation frequency and wavelength. This relationship, which is established by the mirror scanning velocity, is wavelength invariant to within the dispersion of the medium in the optical path scanned. High wavelength accuracy is obtained by including a standard wavelength source in the incident radiation beam. This is known as the Connes advantage.

A traditional disadvantage of FTIR spectroscopy is the sensitivity of the OMA to various perturbations such as shock or vibrations or temperature excursions. In the OMA, a beamsplitter splits the incident radiation into two coherent beams, and after traveling two distinct optical paths, the beams are recombined by the beamsplitter. Intensity modulation is achieved by varying the difference in the optical path traveled by the two beams.

A condition for efficient modulation is that the two separated beams must recombine with precise alignment of the wavefronts angularly and transversely; that is, precise optical alignment of the wavefronts with respect to "tilt" and "shear". Tilt deviation in the recombined wavefronts needs to be controlled more stringently than shear deviation. Tilt corresponding to as little as a fraction of a wavelength delay across the optical beam degrades the modulation.

The need to have precise alignment of the wavefronts with respect to shear is dependent on the plainness of the incident wavefront. A highly collimated beam defining a small field of view is more tolerant to shear than a less collimated beam with a larger field of view and thus the highly collimated beam defining the small field of view does not need to have as precise an alignment of the wavefronts as that which is needed for a less collimated beam with the larger field of view.

A number of patents and other publications have described ways of constructing a scanning Michelson interferometer OMA that exhibits high uniformity of alignment as a function of scanning: See for example the References Cited in U.S. Pat. No. 6,469,790 assigned to Manning ("the '790 patent"). This high uniformity of alignment as a function of scanning can be achieved by the "dynamic alignment" approach where a developing error in alignment is measured and corrected by a servo loop, see for example Canadian Patent No. 1,114,193 assigned to Bomem Inc., or alternately it can be achieved by optical compensation design.

A common technique for optical tilt and shear compensation is a scanning Michelson interferometer with at least one retro-reflector such as a trihedral assembly consisting of a hollow or solid cube corner or a cat's eye assembly, which is scanned approximately linearly and which is provided with a retro-mirror such that the beam passes twice through the scanning retro-reflector. In this approach, the modulation function and modulation efficiency are independent of the linear and angular motion of the cube corner retro-reflectors as they are scanned. The cat's eye retro-reflector compensates for wavefront tilt only to the first order. The trihedral mirror assembly or hollow cube corner retro-reflector with three mutually perpendicular flat mirrors assures wavefront "tilt" compensation independent of any orientation. Double passing removes the effects of shear induced by lateral displacement of the cube corner retro-reflector. The solid cube corner, which is similar to the hollow cube corner retro-reflector, is a retro-reflector made from a full prism having three mutually perpendicular surfaces, and is based either on the principle of total internal reflection on the three mutually perpendicular surfaces, or on reflecting coatings on these surfaces. However, the solid cube corner retro-reflector shows astigmatism due to refraction when rotated and hence causes progressive alignment error when rotated.

U.S. Pat. Nos. 5,949,543 and 6,141,101 assigned to PLX, Inc. describes OMA designs where the retro-mirror(s), the compensator and the beamsplitter are distinct components that are assembled as parts of a monolithic structure to prevent misalignments usually caused by shocks and vibrations. However, the scanning mechanism and retro-reflector are not part of the monolithic structure.

U.S. Pat. No. 4,278,351 assigned to Frosch describes an OMA design that is specifically compensated for tilt and shear as a function of scanning. It uses the double pass technique with a cat's eye retro-reflector with a simple and reliable implementation of the retro-mirror, and includes compensation for the effect of wedge in the beamsplitter and compensator substrate. As is well known to those of ordinary skill in the art, substrates are commonly wedged slightly to avoid parasitic reflections from interfering with the principal beam. Several other patents describe different ways to implement optical tilt and shear compensation as a function of scanning, including the '790 patent describing an OMA design that is a further simplified optical arrangement for a very compact tilt and shear compensated interferometer as a function of scanning.

U.S. Pat. No. 4,383,762, assigned to Kayser-Threde GmbH, ("the '762 patent") describes a method of construction of scanning Michelson interferometers using either a single or double pendulum with cube corner retro-reflectors and one or two flat retro-mirrors respectively such that the modulation function and modulation efficiency are independent of the linear and angular motion of the cube corner retro-reflectors as they are scanned. The double passing of the beam via the retro-mirror ensures shear compensation. In this manner, consistent modulation is achieved over the complete scan trajectory thus providing desirable spectroscopic characteristics. The '762 patent also describes the possibility of eliminating the flat retro-mirror(s) thus reducing by a factor of 2 the gain factor relating the difference of optical path between the two arms and the mechanical displacement of a retro-reflector, and eliminating the alignment constraint required for the retro-mirrors.

The elimination of the flat retro-mirror(s) provides a design simplification as well as a desirable optical arrangement for greater optical beam divergence as is compatible with low resolving power spectroscopy and thus permits greater optical throughput. Because of the inherent tilt immunity provided by the cube corner retro-reflectors, when the retro-mirrors are removed, the modulation function and modulation efficiency remain independent of any angular motion of the cube corner retro-reflector. However, differential translation of one cube corner relative to the other in a direction perpendicular to the optical axis results in a change in modulation because the scanning Michelson interferometer is no longer optically compensated for wavefront shear.

Differential translation of one cube corner relative to the other perpendicular to the optical axis is eliminated when the two cube corners are mounted on a rigid double pendulum structure such that both describe the same circular arc when scanning. This is accomplished most simply by defining a single axis of rotation of the double pendulum structure. In this case, the interferometer is mechanically compensated for shear.

U.S. Pat. No. 5,309,217, assigned to Bruker Analytische Messtechnik ("the '217 patent"), describes an OMA design with cube corner retro-reflectors mounted on a rigid double pendulum with the same mechanical means of shear compensation as described above. By inserting a folding mirror in each arm of the interferometer, the beams reaching the cube corner retro-reflectors can be arranged parallel to each other and close together. This permits a rigid double pendulum where the pendulums are short and oriented at 180 degrees from each other thereby providing a more compact interferometer.

Both the retro-mirrors in the double pass approaches and the added folding mirrors described in the '217 patent require precise orientation and rigid mounting to insure minimal tilt error. For immunity to vibration and shock it is preferred not to include retro-mirrors or folding mirrors in the OMA design.

In contrast to the prior art discussed above, the interferometer of the present invention provides greater immunity to vibration and shock by not including such mirrors in its OMA, as well as by providing a new double pivot scanning mechanism that is significantly more robust to shocks and vibrations.

The OMA construction of the interferometer of the present invention renders the mechanical structure supporting the interferometer's beamsplitter and a pair of scanning cube corner retro-reflectors more rigid. The construction includes two pivot axes that permit a laterally more rigid connection between the pendulums supporting the cube corner retro-reflectors and the beamsplitter mounting structure such that less shear error is introduced as a result of shocks and vibrations applied to the assembly. This OMA construction also provides optical/mechanical compensation for tilt and shear respectively as a function of scanning.

SUMMARY OF THE INVENTION

A two-beam interferometer for measuring radiation using Fourier Transform spectroscopy. The interferometer has:

a first retro-reflector;
a second retro-reflector;
a central body;
a beamsplitter secured to the central body and arranged in the path of a light beam to split the light beam into two beams, one of the two beams directed toward the first retro-reflector and the other beam directed toward the second retro-reflector, and to recombine beam components from the retro-reflectors to form an interference pattern;
a first rigid pendulum rotatable around a first axis of rotation, the first retro-reflector mounted to the first rigid pendulum and spaced from the first axis of rotation;
a second rigid pendulum rotatable around a second axis of rotation, the second retro-reflector mounted to the second rigid pendulum and spaced from the second axis of rotation, the first and the second axis of rotation being spaced apart; and
a linkage secured to the first and second rigid pendulums and positioned to constrain the rotation of the first rigid pendulum relative to the second rigid pendulum.

A monolithic optical assembly for use with an interferometer including:
a first and a second rigid pendulum rotatable about a first and a second axis of rotation respectively, the first and second axis of rotation being spaced apart, the first and the second rigid pendulums linked to each other to constrain the rotation of the first pendulum relative to the rotation of the second pendulum.

A spectrometer that has a two-beam interferometer for measuring radiation using Fourier Transform spectroscopy technique, where the interferometer has:
a first retro-reflector;
a second retro-reflector;
a central body;
a beamsplitter secured to the central body and arranged in the path of a light beam to split the light beam into two beams, one of the two beams directed toward the first retro-reflector and the other of the two beams directed toward the second retro-reflector, and to recombine beam components from the retro-reflectors to form an interference pattern;
a first rigid pendulum rotatable around a first axis of rotation, the first retro-reflector mounted to the first rigid pendulum and spaced from the first axis of rotation;
a second rigid pendulum rotatable around a second axis of rotation, the second retro-reflector mounted to the second rigid pendulum and spaced from the second axis of rotation, the first and second axis of rotation being spaced apart; and
a linkage secured to the first and second rigid pendulum and positioned to constrain the rotation of the first rigid pendulum relative to the second rigid pendulum.

DETAILED DESCRIPTION

Figure 1:
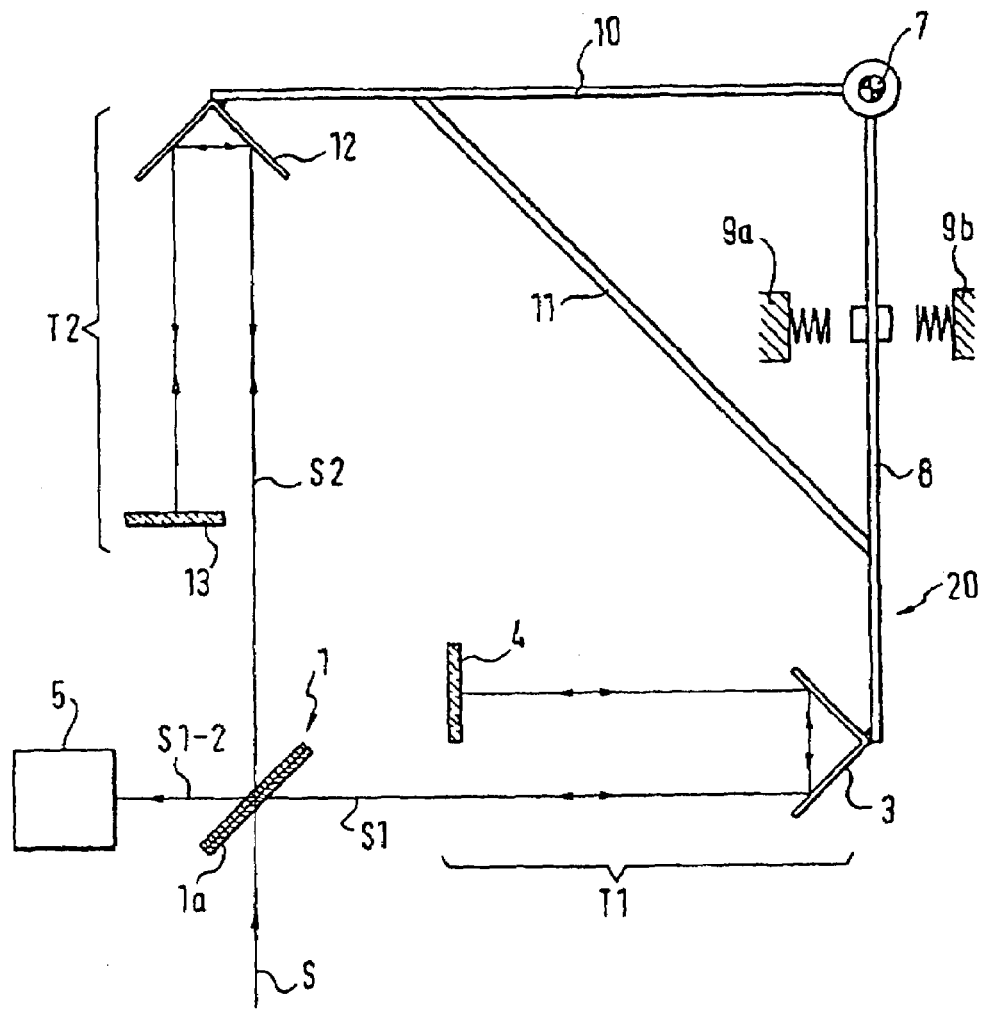
FIG. 1 shows a prior art embodiment for a double pendulum scanning Michelson interferometer.
Figure 2:
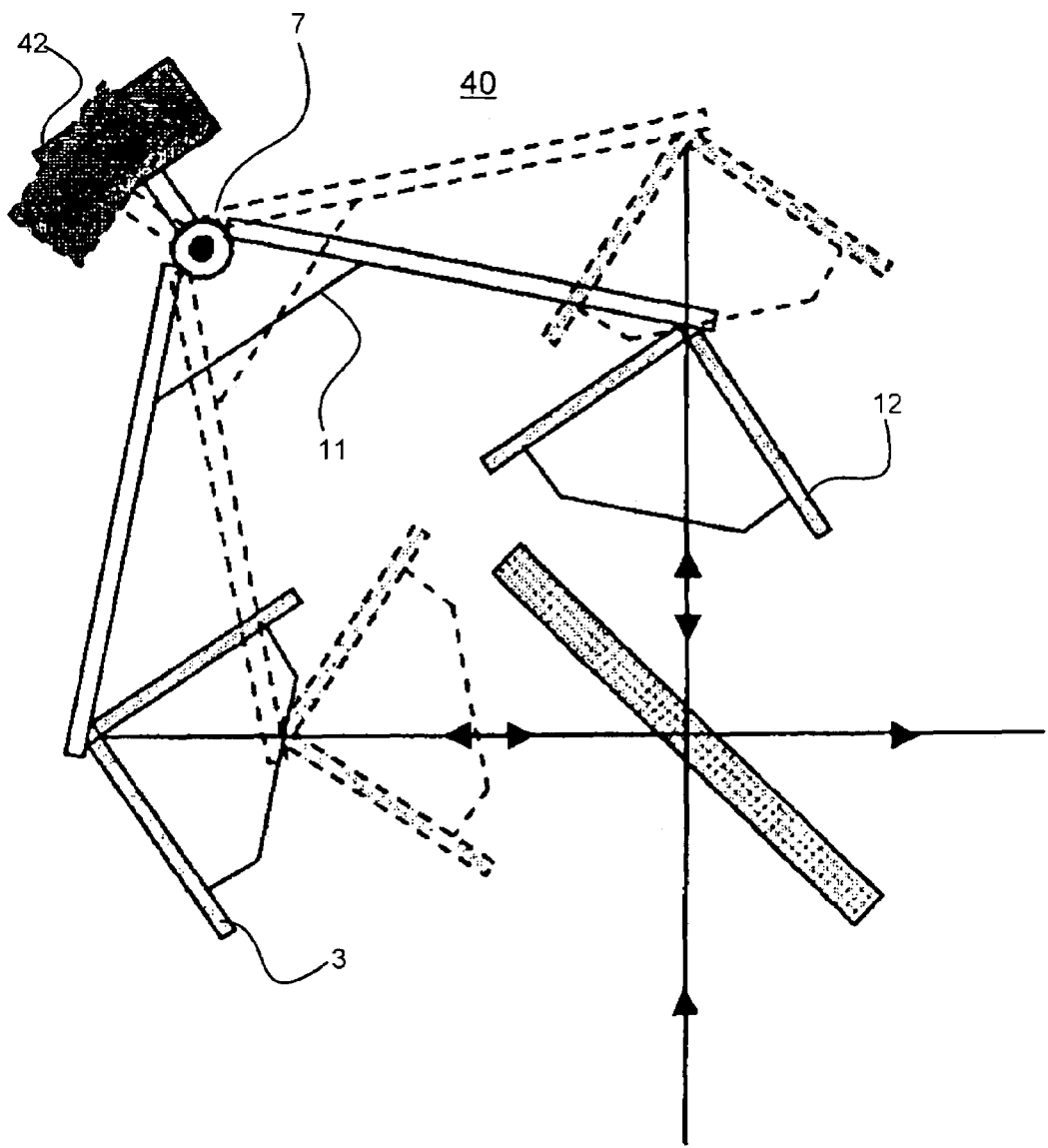
FIG. 2 shows another embodiment for the prior art scanning interferometer of FIG. 1, without the retro-mirrors.

FIG. 1, which is FIG. 2 of the '762 patent, shows the double pendulum scanning Michelson interferometer described in that patent at lines 24 et seq. of col. 5, which description is incorporated herein by reference. As is described in the '762 patent, the beam splitter 1 with compensation plate 1a divides the incoming radiation S to be measured into two partial radiations S1 and S2. The partial radiation S1 strikes the retro-reflector 3 and exits it in a laterally offset, parallel path. This partial radiation is reflected back by stationary mirror 4 of the fully compensating optical system T1 and exits at the original inlet point to reach beam splitter 1.

The partial radiation S2 strikes the retro-reflector 12 and exits it in a laterally offset, parallel path. This partial radiation is reflected back by stationary mirror 13 of the fully compensating optical system T2 and exits at the original inlet point to reach beam splitter 1. The two reflected back partial radiations S1 and S2 reach the beam splitter 1 in interference with each other and reach detector 5 as radiation S1-2. The partial radiations which, after reflection or transmission, return again into the radiation S at the beam splitter 1 are lost for measurement purposes.

As is shown in FIG. 1 and described in the '762 patent, the two retro-reflectors 3, 12 of the two fully compensating optical systems T1, T2 are each fastened to an associated one of the two rigid arms 8, 10 of a double pendulum 20. The two rigid pendulum arms 8, 10 are fastened vertically to each other at the bearing 7 and are stiffened by support arm 11. The two retro-reflectors 3 and 12 can be swung around bearing 7 within the tolerance limits afforded by drive magnets 9a, 9b.

Figure 1A:
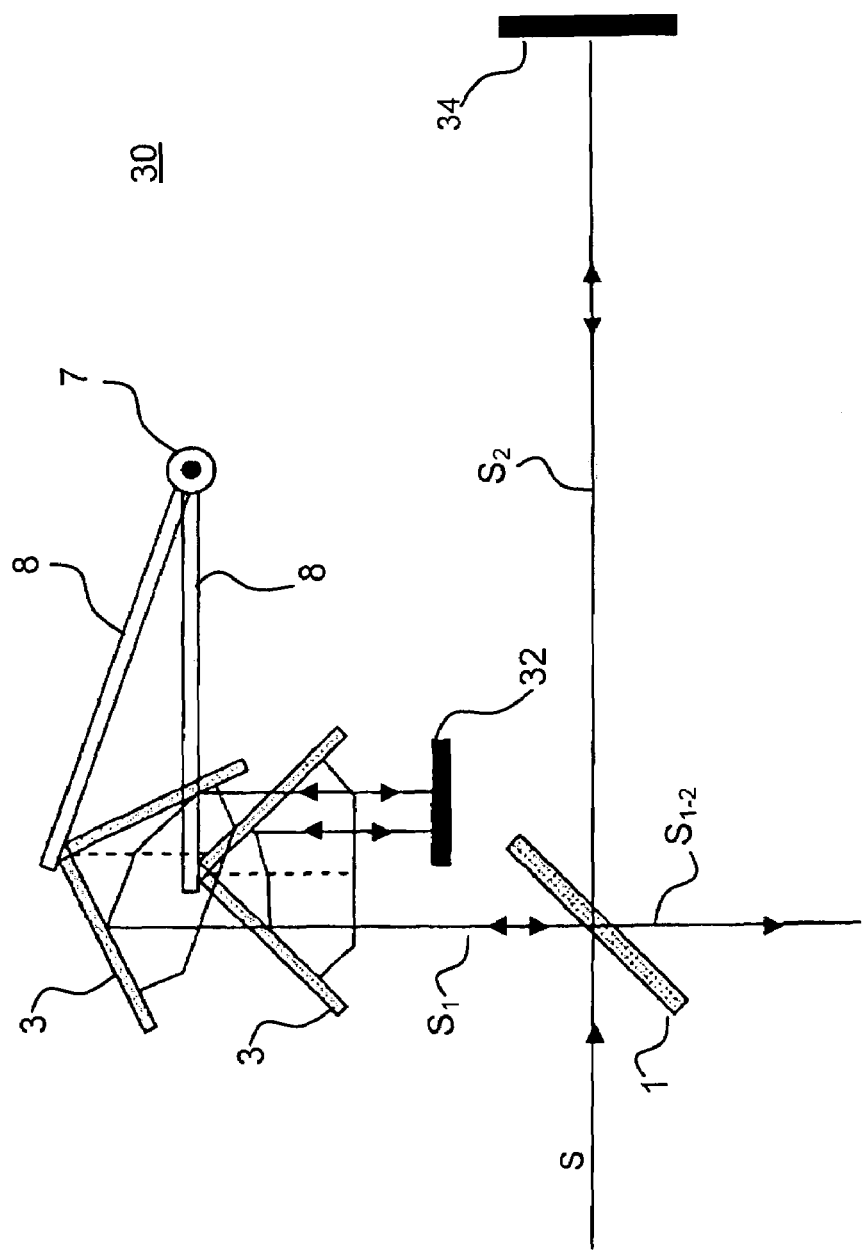
FIG. 1a shows a prior art embodiment for a single pendulum optically tilt and shear compensated scanning Michelson interferometer with rotary scan pendulum.

FIG. 1a shows the general layout of a scanning single pendulum interferometer configuration 30 for a prior art optically tilt and shear compensated scanning Michelson interferometer with a rotary scan pendulum. As compared to the double pendulum interferometer shown in FIG. 1, the single pendulum interferometer 30 of FIG. 1a has only one cube corner retro-reflector 3 mounted on a single pendulum 8 which moves around a pivot axis such as bearing 7 of FIG. 1. The moving cube corner 3 and single pendulum 8 are shown in two positions in FIG. 1a. Since the configuration 30 has only a single pendulum, the other pendulum 10 of the interferometer of FIG. 1 is replaced by the fixed retro-mirror 34.

In configuration 30, the radiation S is split by beam splitter 1 into two partial radiations S1 and S2. The radiation S1 strikes the retro-reflector 3 and exits it in a laterally offset, parallel path. This radiation strikes the mirror 32 and is reflected back to the retro-reflector 3 and then to the beam splitter 1. Radiation S2 strikes the stationary mirror 34 and is reflected back to the beam splitter 1. The two reflected radiations S1 and S2 reach the beam splitter 1 in interference with each other and reach a detector (such as detector 5 of FIG. 1), not shown in FIG. 1a for ease of illustration, as radiation S1-2.

As with the embodiment of FIG. 1, the partial radiations which, after reflection or transmission, return again into the radiation S at the beam splitter 1 are lost for measurement purposes.

FIG. 2 shows the layout of a scanning interferometer of the double pendulum type with the stationary mirrors, also known as retro-mirrors, shown in FIG. 1 as 4 and 13, removed and the two retro-reflectors, also known as cube corner mirrors, 3 and 12 of FIG. 1, mounted on a rigid double pendulum 40 with a single axis 7 of rotation. The rigid double pendulum 40 is stiffened by support arm 11. This interferometer, which is made and sold by ABB Bomem Inc., is optically tilt compensated and mechanically shear compensated. As is shown in FIG. 2, this embodiment for the interferometer also includes a counterweight 42 to put the center of mass at the single pivot axis 7 such that scan rate perturbations are minimized. It should be appreciated that in some configurations for the interferometer of FIG. 2, the counterweight 42 may be the actuator used to drive the scanning of the interferometer. The scanning of the interferometer of FIG. 2 is shown by the dashed lines in that figure for the arms of pendulum 40, the retro-reflectors 3 and 12 and the counterweight 42.

Figure 3:
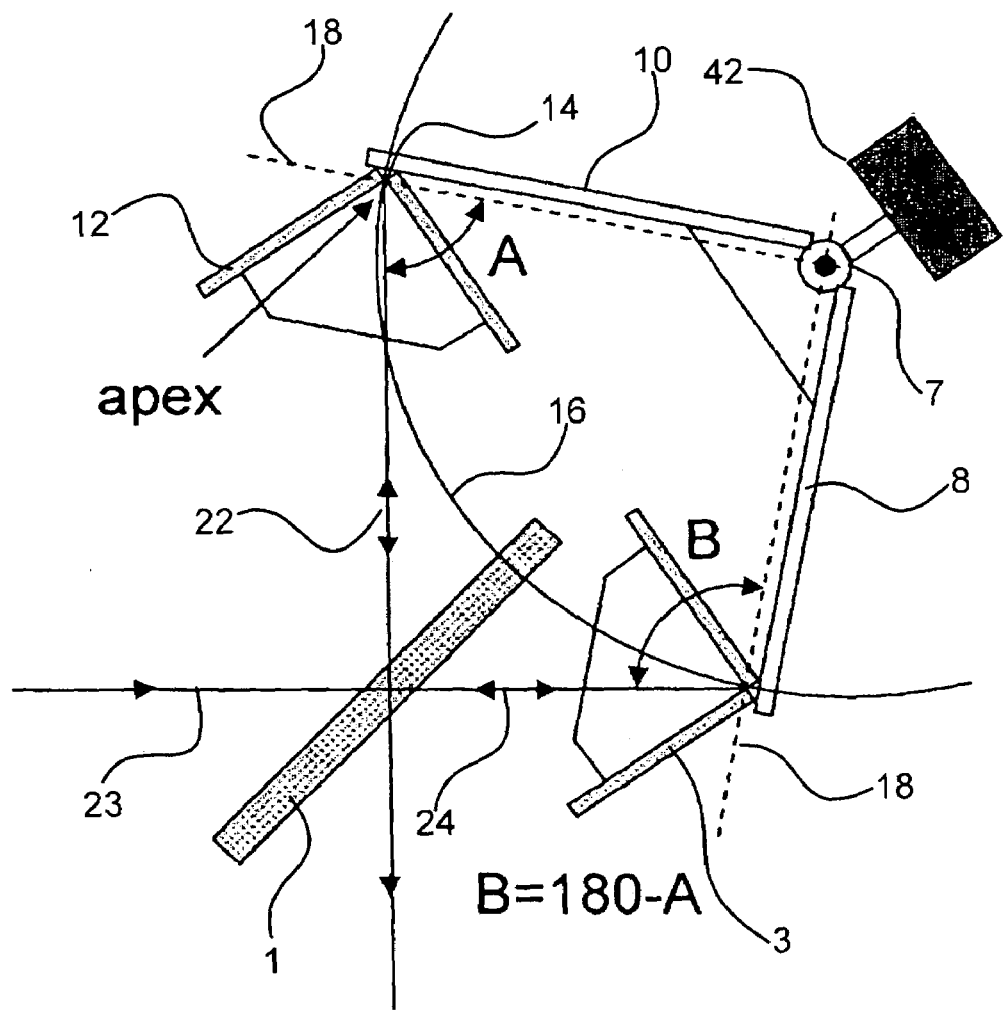
FIG. 3 shows the condition for the mechanical shear compensation of the interferometer of FIG. 2.

FIG. 3 shows the condition for mechanical shear compensation of the interferometer of FIG. 2. As the interferometer is scanning, the trajectory of the apex point of each cube corner mirror 3 and 12 (only one apex point 14 is shown in FIG. 3 for ease of illustration) describes a circular arc 16 that is identical in radius and center, and which center lies in the beam splitting plane or surface of the beamsplitter 1.

As is also shown in FIG. 3, the radius line 18 makes an angle A with the optical ray 22 in one arm 10 of the interferometer and an angle B with the optical ray 24 in the other arm 8. The combination of incoming ray 23 and beamsplitter 1 give rise to optical rays 22 and 24. The optical rays 22 and 24 for which angle B is the supplement of angle A, that is, B=180°−A, and which each lies in the plane of the circular arc 16 define the optical axis of each arm of the interferometer. In other words, the relationship B=180°−A is the condition that defines the optical ray 22 and the optical ray 24 as the optical axis of each arm of the interferometer.

Deviation from the circular scanning trajectory, that is the difference between the radii of the circular scanning trajectory of each apex, or the displacement of the center of the circular scanning trajectory out of the beam splitting plane results in a shear related misalignment. To avoid such misalignment, backlash in the pivot bearings must be avoided and the pendulum must not flex laterally to the optical axis. With a limited angle of rotation of scan, bearing backlash is avoided by using a single or double flexure blade at the pivot axis.

Figure 4:
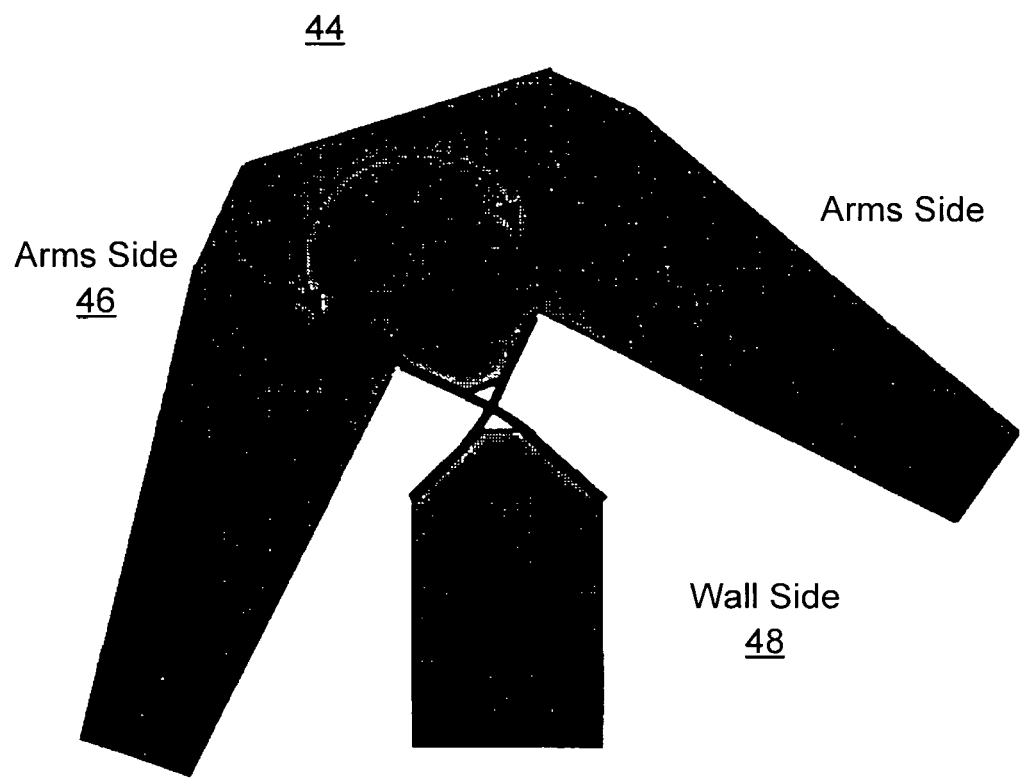
FIG. 4 shows a typical flex pivot arrangement using a flexure bearing.

FIG. 4 shows a typical flex pivot arrangement 44 using a flexure bearing for a limited angle of rotation for an interferometer having a single pivot double pendulum mechanism. As it is well known, flexure bearings have no backlash and hence ensure precise repeatable motion, and do not have friction and do not require lubrication. The arms side 46 of the arrangement 44 is where the pendulums are attached to each other in the interferometer. The wall side 48 of the arrangement 44 is where the beamsplitter of the interferometer is attached. To minimize lateral flexure of the pendulum, the aspect ratio of height to cantilever length and rigidity of the pendulum structure must be maximized.

Figure 5:
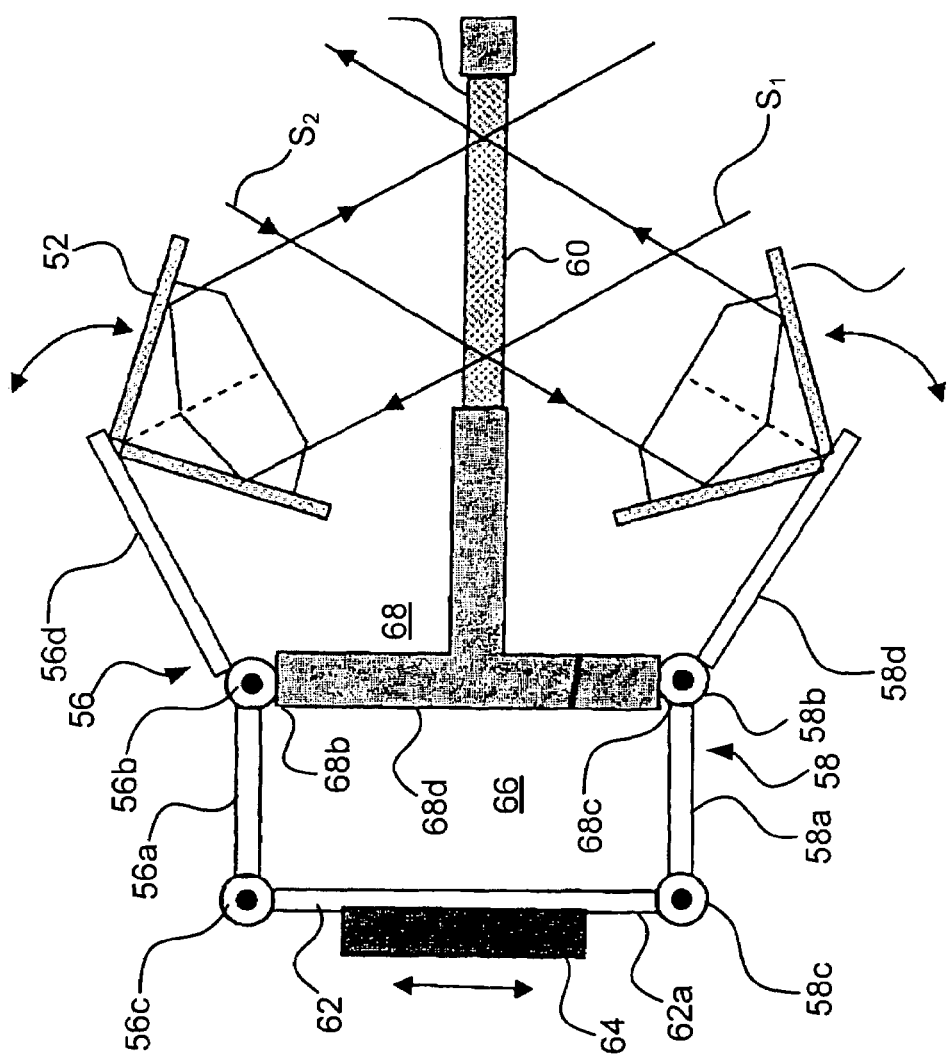
FIG. 5 shows a schematic top view of a double pendulum type scanning Michelson interferometer at rest which is designed in accordance with the present invention.

FIG. 5 shows a schematic top view of a double pendulum type scanning Michelson interferometer 50 at rest, which is designed in accordance with the present invention. In interferometer 50, each of the two cube corners 52, 54 is mounted on an associated one of the two pendulums 56, 58 of a double pivot double pendulum assembly 66. Each of the pendulums 56 and 58 is a single piece having, as is shown in FIG. 5, two "parts" 56a and 56d for pendulum 56 and 58a and 58d for pendulum 58, and those two "parts" of each pendulum 56 and 58 are linked rigidly to each other by a support arm such as the support arm 11 shown in FIG. 3, which is not shown in FIG. 5 for ease of illustration. Thus since the pendulums 56 and 58 are each one piece, the two "parts" 56a and 56d of pendulum 56 and the two "parts" 58a and 58d of pendulum 58 rotate together when the pendulums 56 and 58 are rotated around their respective rotation axes 56b and 58b.

The two pendulums 56 and 58 are connected to each other at bearings 56c and 58c by a coupling linkage 62. The linkage 62 constrains the motion of pendulums 56 and 58 with respect to one another to thereby fix the optical axis of the interferometer 50. A counterweight or preferably an actuator 64 is mounted on the coupling linkage 62. Optical/mechanical compensation of shear in interferometer 50 is related to the position of the pivots 56b and 58b, which define the circles described by the movement of the cube corners 52, 54.

The bearings 56c and 58c and the pivot axes 56b and 58b may be preferably embodied by a flexure bearing that has one or two blades, but could be embodied by other types of bearings. The preferred number of blades in each flexure bearing depends on where the interferometer 50 is intended to be used, since the immunity to shocks and vibrations of the interferometer 50 can be further increased using two-blades flexure bearings. For example, if the interferometer 50 is to be used in a spectrometer for online process analysis, then pivots 56b and 58b would preferably be implemented by a flexure bearing having two blades because the use is such that the spectrometer is likely to be subject to forces that may cause the spectrometer to vibrate. If the interferometer 50 is to be used in a spectrometer for laboratory analysis, then pivots 56b and 58b may be implemented by a simplified flexure bearing having a single blade as the use of the spectrometer is such that the spectrometer is less likely to be subject to forces that cause the instrument to vibrate. The flexure bearings 56c and 58c that are attached to the linkage 62 usually have only one blade for both process and laboratory instruments, although flexure bearings with two blades could improve the robustness to vibrations.

The interferometer 50 also includes a beamsplitter 60 mounted in hole 68a in a T shaped wall 68. As shown in FIG. 5, the pivots 56b and 58b are mounted respectively on the extremities 68b and 68c of the wall portion 68d. The beamsplitter 60 may also include a compensation plate 1a as is shown in FIG. 1.

Figure 6:
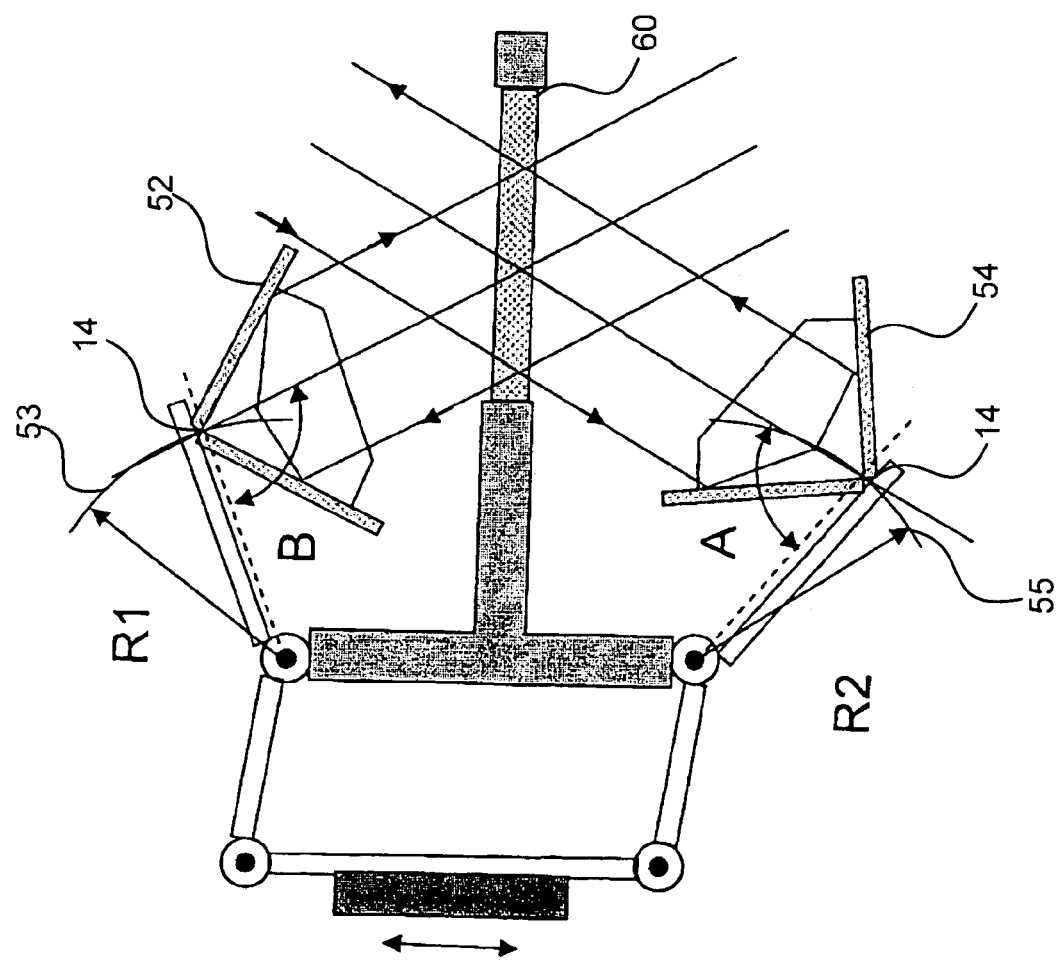
FIG. 6 shows the interferometer of FIG. 5 with the necessary condition for optical/mechanical shear compensation for a double pivot double pendulum scanning interferometer.

As is also shown in FIGS. 5 and 6, those portions of the pendulum arms 56 and 58 that are mounted between pivot axes 56b and 56c and bearings 58b and 58c respectively, in combination with coupling linkage 62 and wall portion 68d, form a quadrilateral structure which is symmetric across the beam splitting plane or surface of the beamsplitter 60 when the interferometer 50 is at rest. The structure shown in FIGS. 5 and 6 is preferably a parallelogram, which shape ensures that when the interferometer 50 is in use, the pendulum arms 56 and 58 both move at the same angular velocity. This last condition is necessary to ensure that the optical axis of the interferometer does not change while the interferometer is scanning.

FIG. 6 shows the interferometer 50 of FIG. 5 with the necessary condition for optical/mechanical shear compensation for a double pivot double pendulum scanning interferometer. As is shown in FIG. 6, as the interferometer is scanning, the trajectory of the apex point 14 of each cube corner 52, 54 describes a circular arc 53 for cube corner 52, and 55 for cube corner 54. To obtain shear compensation, the two circular arcs 53, 55 must be superimposed on the image of each other across the beam splitting plane of the beamsplitter 60. That is the image of one circular arc and its associated pivot axis through the beam splitting plane, the plane that goes through the effective splitting surface of beamsplitter 60, has to be superimposed on the other circular arc and pivot axis as it is also the case in the interferometer described above in FIG. 3.

Figure 7:
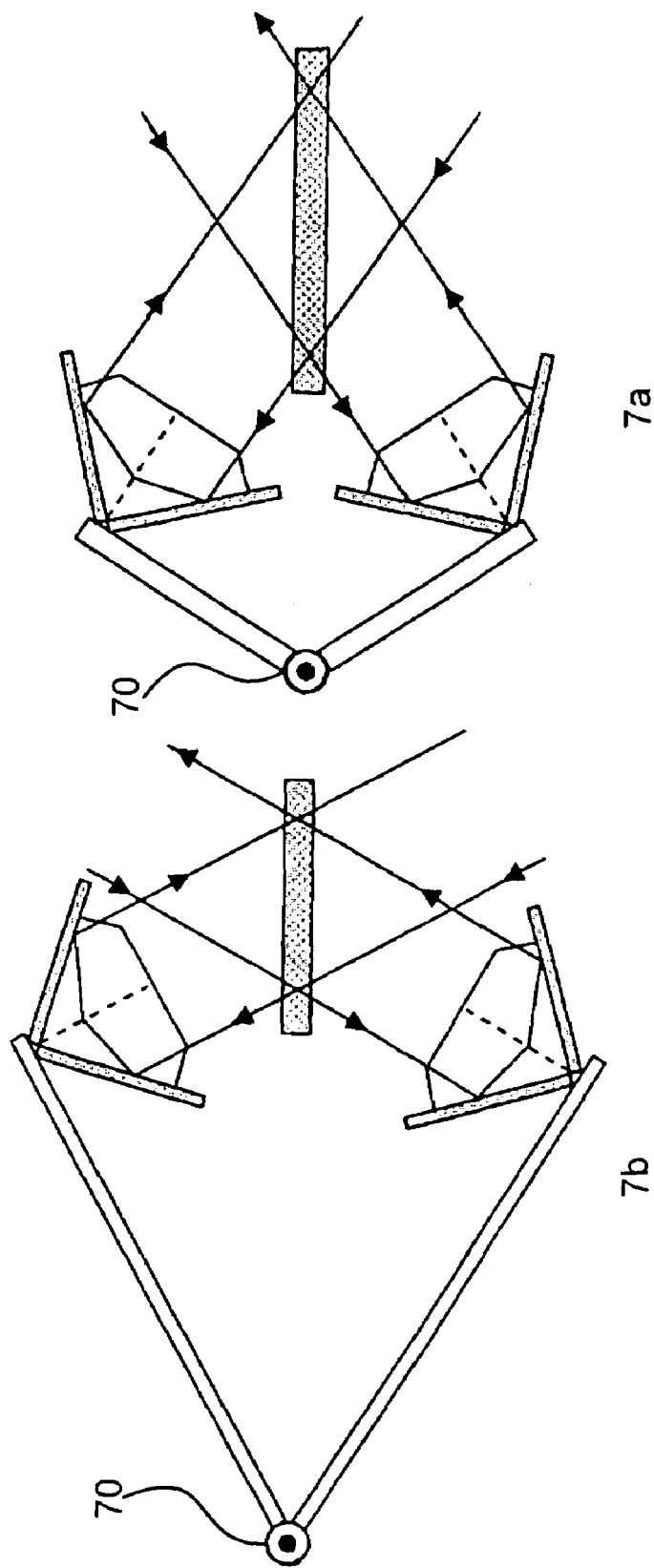
FIGS. 7a and 7b show the constraint of the length of the prior art rigid double pendulum with a single pivot axis as a function of incidence angle of the optical axis at the beamsplitter plate.

FIGS. 7a and 7b show the constraint of the length of the prior art rigid double pendulum with a single pivot axis as a function of incidence angle of the optical axis at the beamsplitter plate. As the incidence angle is reduced, as is shown in FIG. 7b, as compared to the incidence angle in FIG. 7a, FIG. 7b shows that the pivot axis 70 is shifted further away from the cube corner mounting. The double pendulum of FIG. 7b has usually less polarization sensitivity than the double pendulum of FIG. 7a because as is well known to those in the art the polarization sensitivity of a beamsplitter usually increases with the incidence angle of the optical axis which is less for the pendulum of FIG. 7b than for the pendulum of FIG. 7a. Polarization sensitivity is the difference of modulation between the light that has a linear polarization parallel to the plane of incidence on the beamsplitter 72 and the light that has a linear polarization perpendicular to the plane of incidence on the beamsplitter 72.

Further the surface or footprint of the beamsplitter 72 of FIG. 7a is larger than the footprint of the beamsplitter 74 of FIG. 7b. Therefore the double pendulum of FIG. 7b, based on the foregoing, would be preferred over the double pendulum of FIG. 7a except that the double pendulum of FIG. 7b is much longer than the double pendulum of FIG. 7a. Thus the double pendulum of FIG. 7b is not acceptable in those applications that have a constraint on length.

In contrast thereto, there is no length constraint for each pendulum 56, 58 of the double pendulum double pivot design of the present invention that is shown in FIGS. 5 and 6 as a function of incidence angle of the optical axis at the beamsplitter. The two separate pivot axis of the interferometer of the present invention allows to reduce each pendulum to the minimum length necessary to achieve the optical path difference that is required by the scanning function. The two pivot axes permit also a laterally more rigid flex-pivot connection between the pendulum and the beamsplitter mounting structure. A preliminary study has shown that for a 30° angle of incidence, the footprint of the double pivot design of the present invention could be about 45% of the footprint of the single pivot design of the prior art.

Figure 8A:
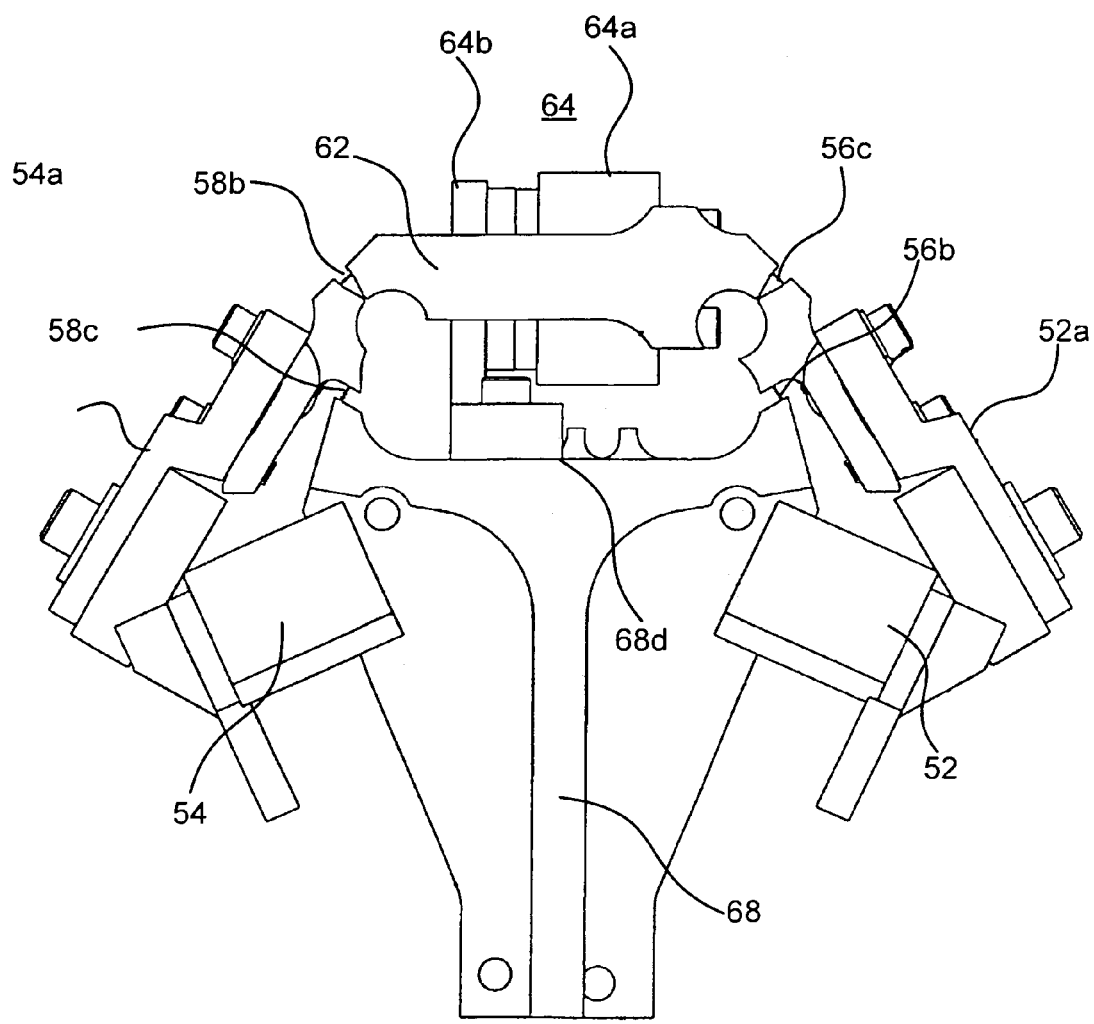
FIGS. 8a, 8b and 8c show three views, including an exploded perspective in FIG. 8c, of a one piece double pendulum type scanning Michelson interferometer at rest which is embodied in accordance with the present invention.
Figure 8B:
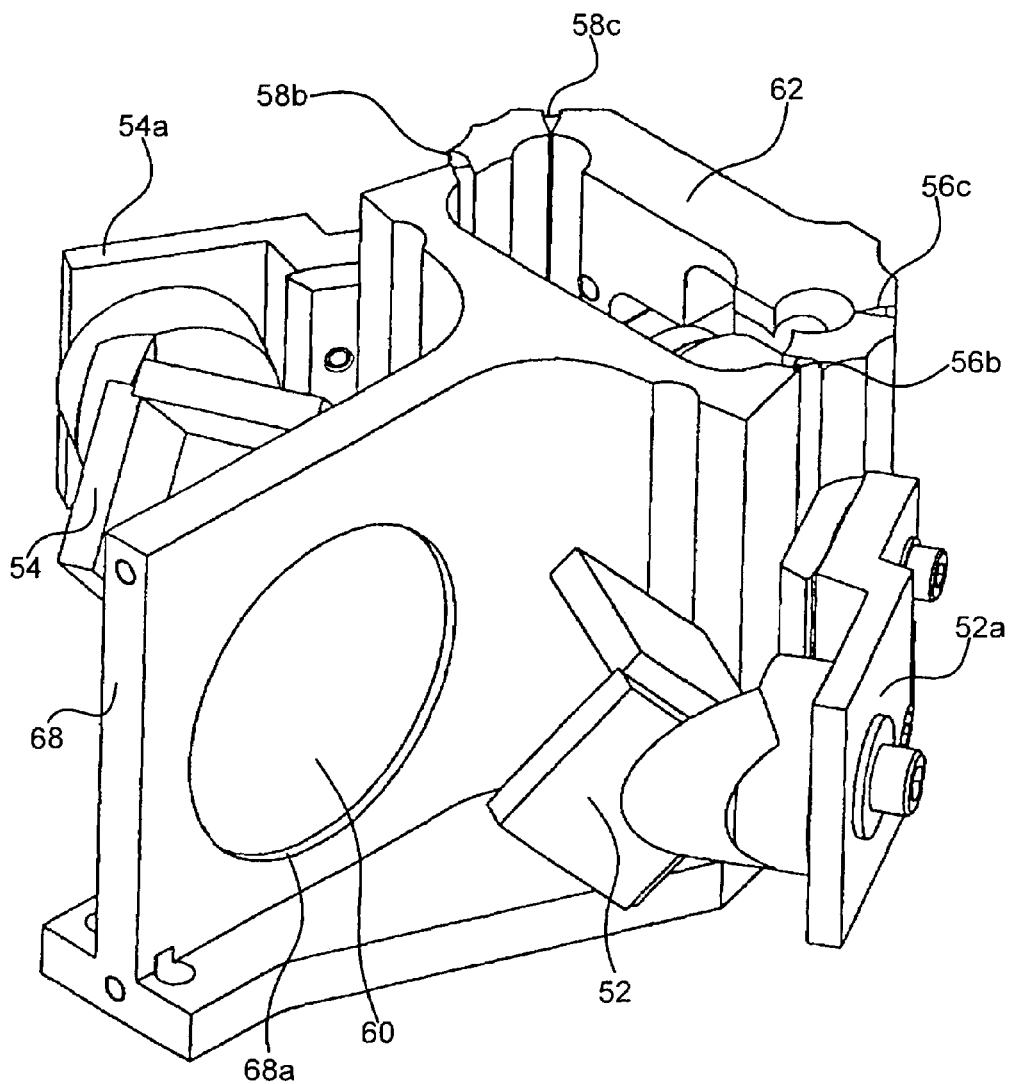
Figure 8C:
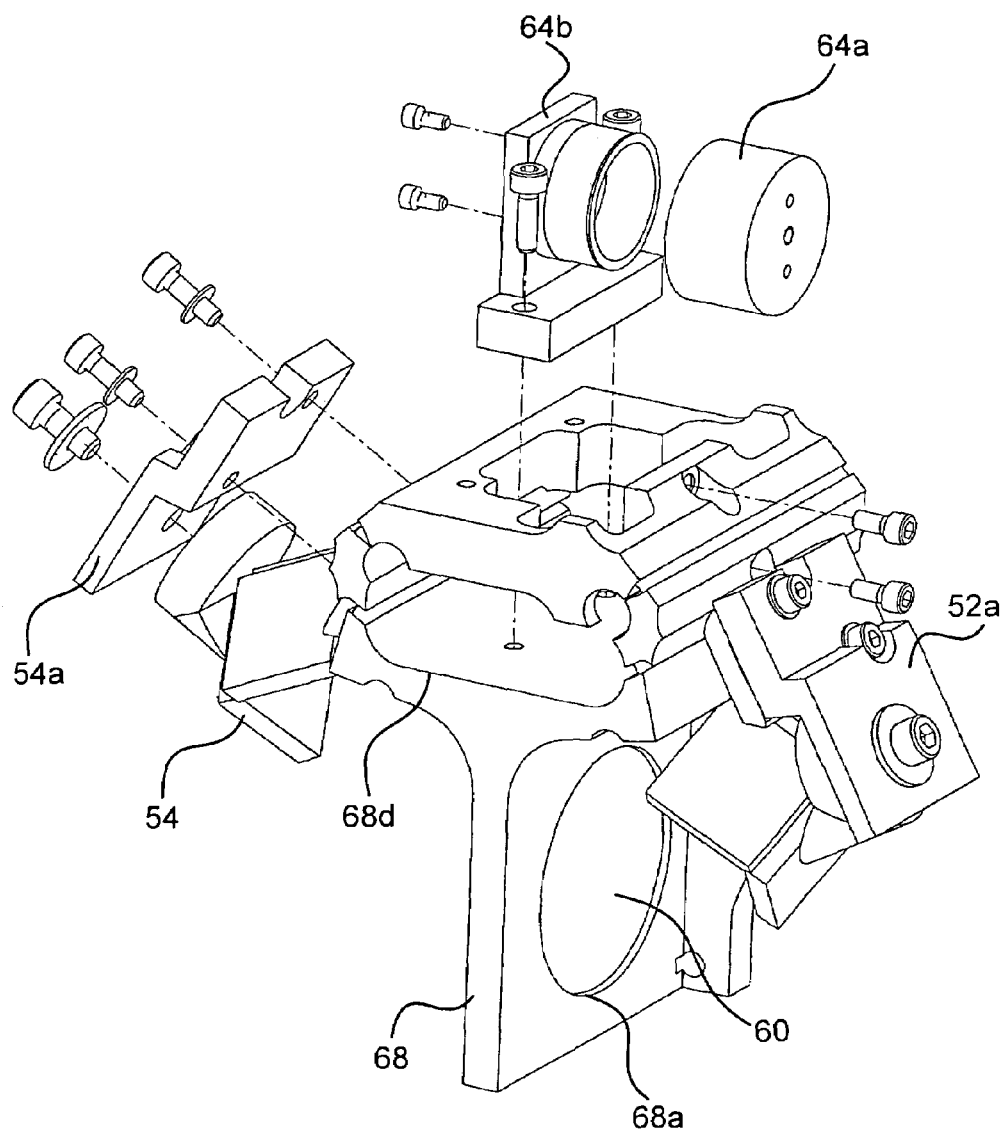

FIGS. 8a, 8b and 8c show three views, including an exploded perspective in FIG. 8c, of a one-piece or monolithic double pendulum type scanning Michelson interferometer at rest that is embodied in accordance with the present invention. The one-piece double pendulum interferometer is referred to as the monolithic double pivot interferometer. The elements shown in FIGS. 8a to 8c that have the same function as the elements shown in FIGS. 5 and 6 have the reference numerals used in those figures. Elements shown in FIGS. 8a to 8c that are not shown in FIGS. 5 and 6 have new reference numerals. Thus the interferometer shown in FIGS. 8a to 8c is designated as 50 even though it is a specific embodiment of the interferometer of the present invention.

As is shown in all three figures, the interferometer 50 has a first set of flexure bearings 56b and 58b that function as the rotation centers for pendulums 56 and 58. The interferometer 50 has a second set of flexure bearings 56c and 58c that function along with linkage 62 to link the two pendulums 56 and 58 to each other. As is most clearly shown in FIGS. 8b and 8c, the interferometer 50 has a T shaped wall 68 with a hole 68a that has mounted therein the beamsplitter 60.

As is also shown in all three figures, the interferometer 50 has two cube corner retro-reflectors 52 and 54. The means 52a and 52b to mount the cube corners 52 and 54, respectively, to the associated part of pendulums 56 and 58 are most clearly shown in the exploded perspective of FIG. 8c.

As was described in connection with FIG. 5, the interferometer 50 has a counterweight 64 which is preferably an actuator mounted on the coupling linkage 62. In the embodiment shown in FIGS. 8a to 8c, the counterweight 64 is a voice coil actuator 64a having associated therewith a coil mount 64b. FIG. 8c shows how the voice coil actuator 64a and coil mount 64b are mounted to the linkage 62 and wall portion 68d of T shaped wall 68.

The monolithic double pivot interferometer 50 is built from one piece that includes the linkage 62, the flexure blades 56b, 56c, 58b and 58c, and part of or the whole beamsplitter wall 68, as well as part of or the whole pieces that constitute the pendulums 56 and 58. A monolithic double pivot interferometer 50 has significant advantages for manufacturing (less parts, faster assembling) as well as for the reproducibility of alignment of the flexure blades 56b, 56c, 58b and 58c from one interferometer to the other.

Figure 9:
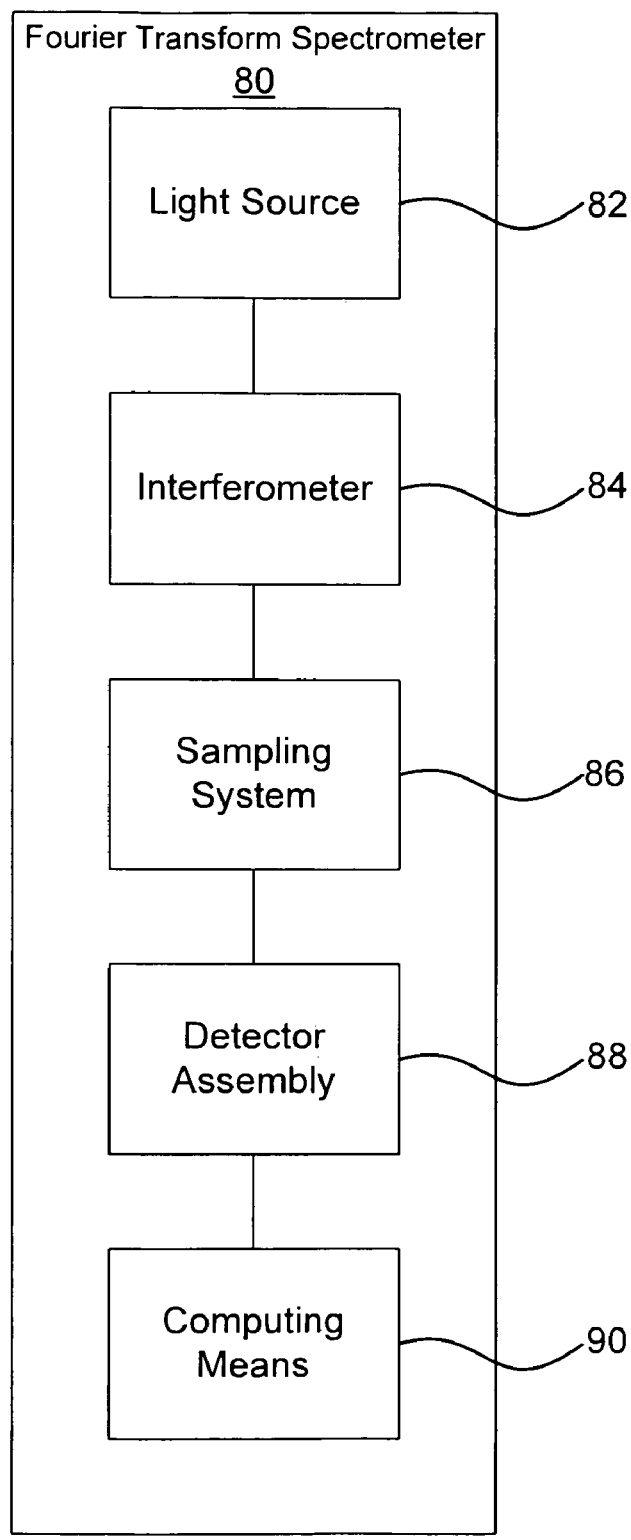
FIG. 9 shows a block of a typical Fourier Transform spectrometer.

Referring now to FIG. 9, there is shown a block diagram of a typical Fourier Transform spectrometer 80 in which the two-beam interferometer of the present invention can be used. As is shown in FIG. 9, a typical spectrometer may include a light source 82 for providing the incoming radiation, an interferometer 84, a sampling system 86 where the sample to be analyzed by the spectrometer 80 is placed, and a detector assembly 88 in combination with computing means 90 to determine the intensity of the wavelengths (the spectrum) of the modulated light. While not shown in FIG. 9, it is well known to those of ordinary skill in this art that spectrometer 80 will also include driving electronics and a metrology system. Further as is well known to those of ordinary skill in this art, the source 82 may not be in the spectrometer 80 since for example remote sources such as the Sun may be used as the light source for remote sensing applications, and the computing means 90 may also not be in spectrometer 80 as an external computing device such as a PC may be used as the computing means. Further, and as is also well known, some types of spectrometers such as those in space satellites do not have a sampling system since the satellite is monitoring light or radiation from remote sources such as the heat emitted from the Earth surface or the atmosphere, or the stars.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A two-beam interferometer for measuring radiation using Fourier Transform spectroscopy comprising:
   a first retro-reflector;
   a second retro-rellector;
   a central body;
   a beamsplitter secured to said central body and arranged in the path of a light beam to split said light beam into two beams, one of said two beams directed toward said first retro-reflector and the other of said two beams directed toward said second retro-reflector, and to recombine beam components from said retro-reflectors to form an interference pattern;
   a first rigid pendulum rotatable around a first axis of rotation, said first retro-reflector mounted to said first rigid pendulum and spaced from said first axis of rotation;
   a second rigid pendulum rotatable around a second axis of rotation, said second retro-reflector mounted to said second rigid pendulum and spaced from said second axis of rotation, said first and said second axis of rotation being spaced apart; and
   a linkage secured to said first and said second rigid pendulums and positioned to constrain the rotation of said first rigid pendulum relative to said second rigid pendulum.

2. The interferometer of claim 1 wherein said first and second retro-reflectors are hollow cube corner assemblies, solid internal reflecting cube corner, or cat's eyes assemblies designed as reflectors or lenses.

3. The interferometer of claim 1 further comprising a first bearing for rotatably mounting said first rigid pendulum to said central body and a second bearing for rotatably mounting said second rigid pendulum to said central body, and a third bearing linking said linkage to said first rigid pendulum and a fourth bearing linking said linkage said second pendulum.

4. The interferometer of claim 3 wherein at least a portion of said first and said second rigid pendulums, said linkage, and at least a portion of said central body define a parallelogram.

5. The interferometer of claim 3 wherein said first and said second bearings are flexure bearings having one or more blades.

6. The interferometer of claim 3 wherein said third and said fourth bearings are flexure bearings having one or more blades.

7. The interferometer of claim 3, wherein at least a portion of said first and second rigid pendulums, said linkage, said central body, and said bearings are a monolithic structure.

8. The interferometer of claim 7 wherein said central body is T-shaped and includes means for mounting said beamsplitter.

9. The interferometer of claim 1 further comprising fixed retro-mirrors mounted to said central body to reflect the radiation back to said retro-reflectors.

10. A monolithic optical assembly for use with an interferometer comprising:
    a first and a second rigid pendulum rotatable about a first and a second axis of rotation respectively, said first and second axis of rotation being spaced apart, said first and said second rigid pendulums linked to each other to constrain the rotation of said first pendulum relative to the rotation of said second pendulum.

11. The monolithic optical assembly of claim 10 further comprising a first movable retro-reflector mounted to said first rigid pendulum and a second movable retro-reflector mounted to said second rigid pendulum and spaced from the axis of rotation of each of said first and said second pendulum.

12. The monolithic optical assembly of claim 11 further comprising a central body and a beamsplitter mounted to said central body and arranged in the path of a light beam to split said light beam into two beams, one of said two beams going toward said first retro-reflector and the other of said two beams going toward said second retro-reflector and to recombine beam components from said first and second movable retro-reflectors to form an interference pattern.

13. The monolithic assembly of claim 10 further comprising a linkage and a first and a second bearing, wherein said linkage links to said first rigid pendulum at a third bearing and fourth rigid pendulum links to said linkage at a said second bearing.

14. The monolithic assembly of claim 13 further comprising a first bearing pivotally mounting said first rigid pendulum to said central body at said first axis of rotation and a second bearing pivotally mounting said second rigid pendulum to said central body at said second axis of rotation, wherein said first and said second and said third and said fourth bearings are flexure bearings.

15. The monolithic assembly of claim 14 wherein said first and said second and said third and said fourth bearings are each single blade flexure bearings.

16. The monolithic assembly of claim 15 further comprising one or more additional blades affixed to said central body to provide in combination with one or more of said single blade flexure bearings a flexure bearing having two or more blades.

17. A spectrometer comprising a two-beam interferometer for measuring radiation using Fourier Transform spectroscopy technique, said interferometer comprising:
 a first retro-reflector;
 a second retro-reflector;
 a central body:
 a beamsplitter secured to said central body and arranged in the path of a light beam to split said light beam into two beams, one of said two beams directed toward said first retro-reflector and the other of said two beams directed toward said second retro-reflector, and to recombine beam components from said retro-reflectors to form an interference pattern;
 a first rigid pendulum rotatable around a first axis of rotation said first retro-reflector mounted to said first rigid pendulum and spaced from said first axis of rotation;
 a second rigid pendulum rotatable around a second axis of rotation, said second retro-reflector mounted to said second rigid pendulum and spaced from said second axis of rotation, said first and said second axis of rotation being spaced apart; and
 a linkage secured to said first and said second rigid pendulum and positioned to constrain the rotation of said first rigid pendulum relative to said second rigid pendulum.

18. The spectrometer of claim 17 wherein said interferometer further comprises a first bearing for rotatably mounting said first rigid pendulum to said central body and a second bearing for rotatably mounting said second rigid pendulum to said central body, and a third bearing linking said linkage to said first rigid pendulum and a fourth bearing linking said linkage said second pendulum.

19. The interferometer of claim 18, wherein at least a portion of said first and second rigid pendulums, said linkage, said central body, and said bearings are a monolithic structure.

* * * * *